R. W. SCOTT.
STOP MOTION DEVICE.
APPLICATION FILED APR. 24, 1916.

1,270,063.

Patented June 18, 1918.
3 SHEETS—SHEET 1.

INVENTOR
ROBERT W. SCOTT
BY HIS ATTORNEY
Harry Smith

R. W. SCOTT.
STOP MOTION DEVICE.
APPLICATION FILED APR. 24, 1916.

1,270,063.

Patented June 18, 1918.
3 SHEETS—SHEET 2.

INVENTOR
ROBERT W. SCOTT
BY HIS ATTORNEY
Harry Smith

R. W. SCOTT.
STOP MOTION DEVICE.
APPLICATION FILED APR. 24, 1916.

1,270,063.

Patented June 18, 1918.
3 SHEETS—SHEET 3.

INVENTOR
ROBERT W. SCOTT
BY HIS ATTORNEY
Harry Smith

UNITED STATES PATENT OFFICE.

ROBERT W. SCOTT, OF BOSTON, MASSACHUSETTS, ASSIGNOR, BY MESNE ASSIGNMENTS, TO SCOTT & WILLIAMS, INCORPORATED, A CORPORATION OF MASSACHUSETTS.

STOP-MOTION DEVICE.

1,270,063.        Specification of Letters Patent.      Patented June 18, 1918.

Application filed April 24, 1916. Serial No. 93,143.

*To all whom it may concern:*

Be it known that I, ROBERT W. SCOTT, a citizen of the United States, residing in Boston, Massachusetts, have invented certain Improvements in Stop-Motion Devices, of which the following is a specification.

My invention consists of a clutching and releasing device intended for application to a machine having more than one driving pulley, the object of my invention being to effect stoppage of the machine irrespective of the driving pulley to which the power is applied.

This object I attain in the manner hereinafter set forth, reference being had to the accompanying drawings, in which—

Figure 1:
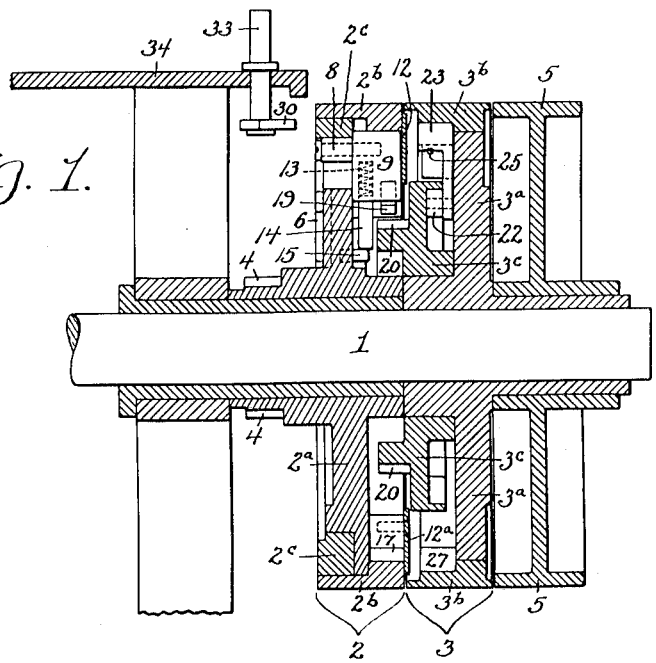
Figure 1 is a view, partly in central vertical section and partly in elevation, of part of a machine having a driving shaft with two driving pulleys thereon provided with clutching and releasing devices in accordance with my invention.

In the drawings, 1 represents a shaft to which power can be applied by either of two pulleys 2 and 3 disposed side by side on said shaft, each of these pulleys being adapted for the reception of the driving belt or other device whereby power is applied to the machine. In the present instance I have shown my invention applied to a knitting machine of the type shown in my Letters Patent No. 1,152,850, dated September 7th, 1915, in which power is applied from the pulley 3 directly to the shaft 1 and from the pulley 2 to said shaft through means of intervening gearing driven from a spur wheel 4 on the hub of said pulley.

In a device of this type the shaft 1 and pulley 3 rotate at a higher rate of speed than the pulley 2 when the driving belt is on the latter, and the pulley 2 rotates at a slower speed than the shaft 1 and pulley 3 when the driving belt is on the latter. The application of power to the machine can be arrested as usual by shifting the driving belt onto the loose pulley 5.

My invention comprises means whereby the application of power to the machine can be arrested when the driving belt is on either of the pulleys 2 or 3.

Figure 3:
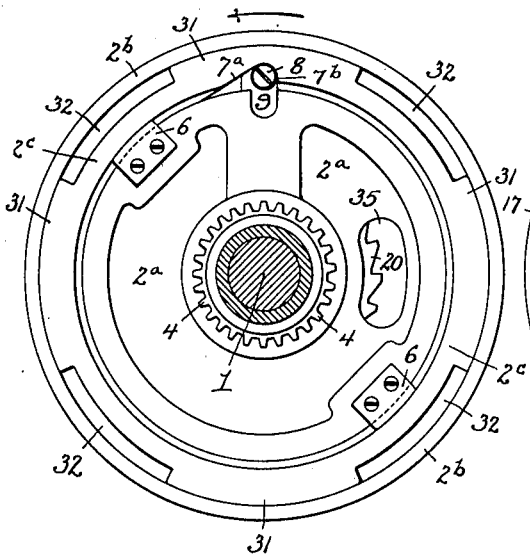
Fig. 3 is a left-hand face view of the driving pulley at the left of the series with the parts in the position shown in Fig. 1.
Figure 4:
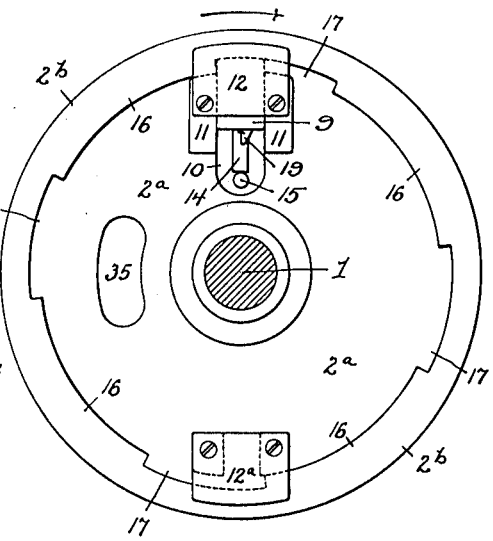
Fig. 4 is a view of the opposite face of the same.
Figure 5:
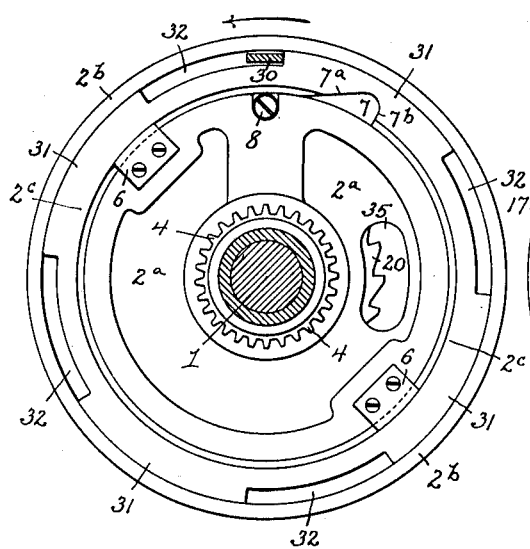
Fig. 5 is a view similar to Fig. 3, but with the parts in the position shown in Fig. 2.

Each of these pulleys is composed of a central web member $2^a$ or $3^a$ having a hub secured to or forming part thereof and a rim member $2^b$ or $3^b$ which is mounted so as to be free to rotate on the web member of the pulley but is normally clutched thereto in the following manner:

Mounted so as to be free to rotate in a recess in the periphery of the web member $2^a$ is a ring $2^c$ which is held in position in said recess between a flange of the web member and clip plates 6 secured to said web member and engaging a groove in the face of the ring, as shown in Figs. 1, 3 and 5. In the inner face of said ring $2^c$ is formed a recess 7 with cam face $7^a$ and abrupt face $7^b$, as shown in Fig. 5, and when the machine is running normally the abrupt face $7^b$ of said recess bears against an anti-friction roller 8 mounted on a pin projecting from a radially slidable bolt 9 which is guided in a radial recess 10 in the right hand face of the web member $2^a$ and between cheek pieces 11 projecting from said face on opposite side of the recess, as shown in Fig. 4, dislodgment of said bolt being prevented by means of a cap plate 12 mounted on said cheek pieces, and said bolt 9 being normally projected by means of a spring 13 contained in a socket in said bolt and pressing outwardly upon a rod 14 which is seated at its inner end upon a pin 15 projecting laterally from the web 2ª, as shown in Fig. 1.

The outer portion of the face plate 12, and of a similar and diametrically opposite face plate 12ª, lap the right hand face of the rim member 2ᵇ of the pulley, as shown in Figs. 1 and 4, and prevent lateral displacement of said rim member.

The outward thrust imparted to the bolt 9 serves to maintain the outer portion of the same in engagement with one or other of a series of segmental lugs 16 which alternate with intervening segmental recesses 17 on the inner face of the rim 2ᵇ of the wheel, as shown in Figs. 1 and 4. Assuming, therefore, that power is being applied to the rim 2ᵇ to rotate the same in the direction of the arrow Fig. 4, said rotating movement will, through the medium of the bolt 9, be transmitted to the web 2ª and to the ring 2ᶜ carried thereby.

Figure 10:
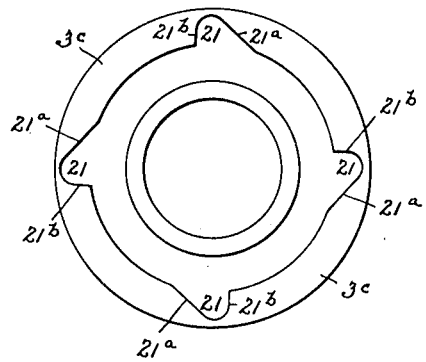
Fig. 10 is a right-hand face view of a certain unclutching member constituting part of the pulley shown in Figs. 7 and 8.

Mounted on the hub of the pulley web 3ª so as to rotate therewith but free to turn backwardly thereon, is a ring 3ᶜ having on one face a projecting flange with ratchet teeth 20 formed thereon and in the opposite face a series of recesses 21 similar to the recess 7 of the ring 2ᶜ, and each having a cam face 21ª and an abrupt face 21ᵇ, as shown in Fig. 10.

Figure 2:
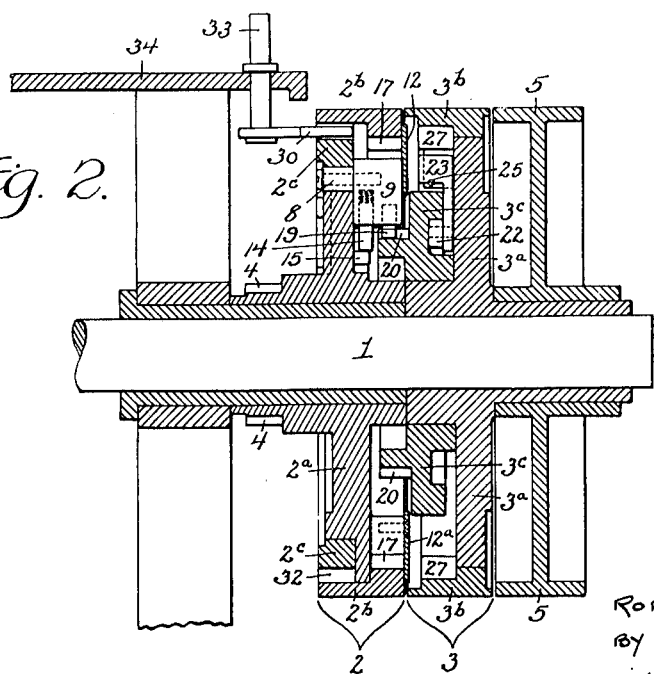
Fig. 2 is a similar view illustrating some of the parts in different positions from those shown in Fig. 1.
Figure 6:
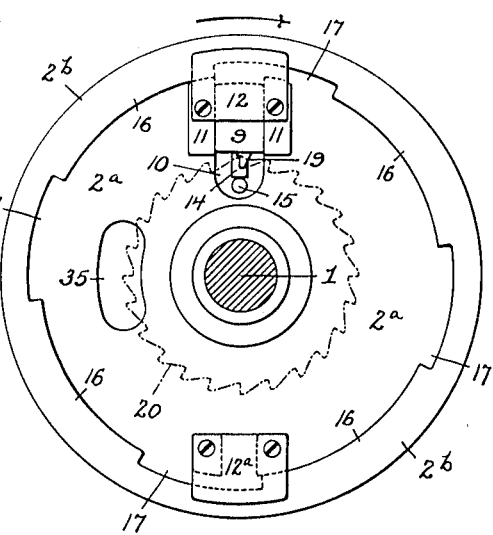
Fig. 6 is a view similar to Fig. 4, but with the parts in the position shown in Fig. 2.

On the inner face of the bolt 9 is a projecting tooth 19, which, when said bolt is projected, as shown in Figs. 1 and 4, is free from engagement with the teeth of the ratchet 20, but, when said bolt is driven inward, as shown in Figs. 2 and 6, engages said teeth, so that, simultaneously with the disengagement of the web 2ª from the rim 2ᵇ, said web is locked to the ring 3ᶜ and prevents rotation of the latter with the web member 3ª.

Figure 7:
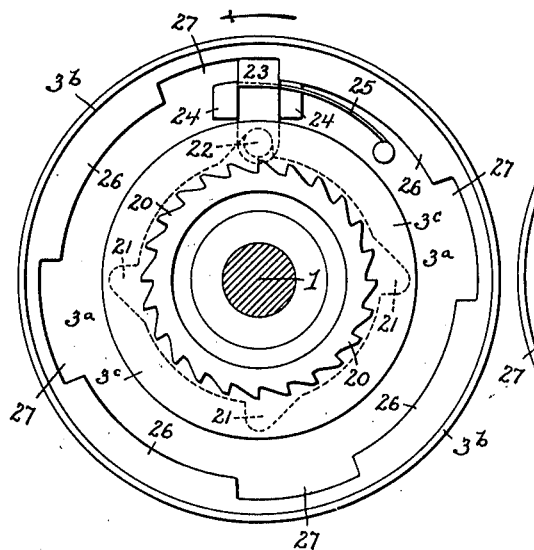
Fig. 7 is a left-hand face view of the central pulley of the series with the parts thereon in the position shown in Fig. 1.
Figure 8:
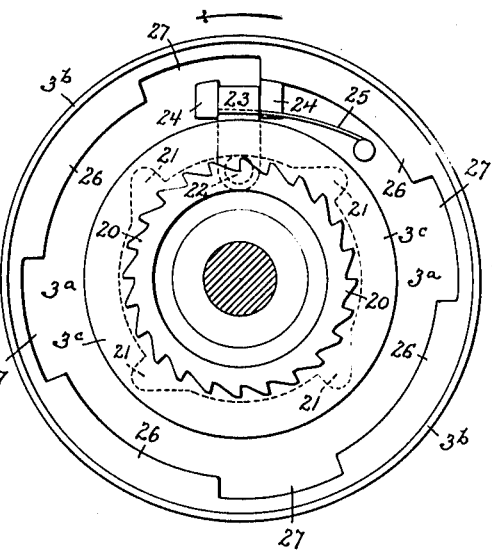
Fig. 8 is a similar view with the parts thereon in the position shown in Fig. 2.

Normally engaging one of the recesses 21 of the ring 3ᶜ is an anti-friction roller 22 carried by a bolt 23 which is guided radially between cheek pieces 24 on the web 3ª and is normally projected by means of a spring 25 so as to engage with one or other of a series of segmental lugs 26 which alternate with intervening segmental recesses 27 around the inner periphery of the wheel rim 3ᵇ, as shown in Figs. 7 and 8.

When, therefore, rotation of the ring 3ᶜ is prevented by engagement of the tooth 19 with one of the ratchet teeth 20, further rotation of the web 3ª in the direction of the arrow Figs. 7 and 8 will cause the cam surface 21ª of the recess containing the roller 22 to act upon said roller and withdraw the bolt 23 radially out of engagement with the lug 26 of the rim 3ᵇ with which it was formerly in engagement, thus freeing the rim 3ᵇ from rotative engagement with the web 3ª.

It will be observed, therefore, that whenever the rotation of the ring 2ᶜ is arrested, such arrest of movement will result first in freeing the rim 2ᵇ from rotative engagement with the web 2ª and then, because of the consequent arrest of rotation of the ring 3ᶜ, will result in freeing the rim member 3ᵇ from rotative engagement with the web member 3ª, hence no matter to which of the pulleys the power is being applied further application of power to the shaft 1 will be prevented and the machine will be stopped.

Figure 11:
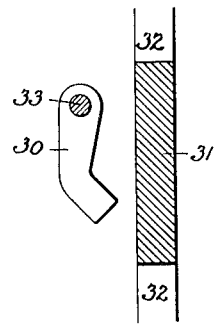
Figs. 11 and 12 show, in different positions, a top view of the actuating finger and a sectional view of part of the unclutching member which coöperates therewith.
Figure 12:
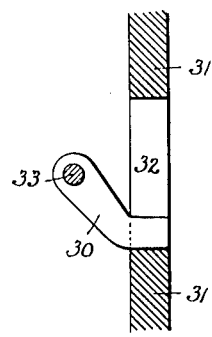
Figure 9:
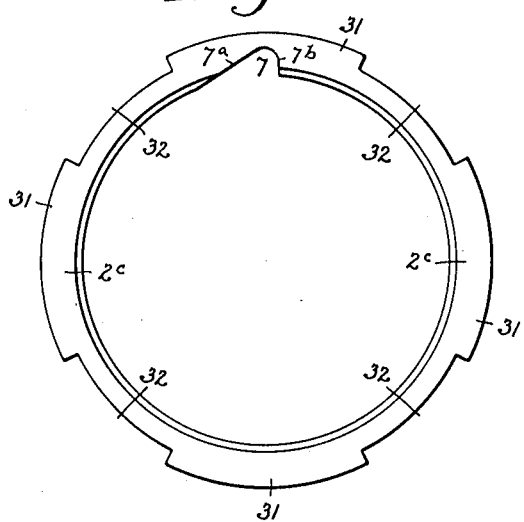
Fig. 9 is a left-hand face view of a certain unclutching member constituting part of the pulley shown in Figs. 2 to 6.

The rotation of the ring 2ᶜ may be arrested in any suitable way, as, for instance, by causing a finger 30 to be thrown into engagement with one or other of a series of lugs 31 which alternate with recesses 32 around the periphery of said ring 2ᶜ, as shown in Fig. 9. The stop finger may be carried by the lower end of a short shaft 33 mounted so as to be susceptible of rocking motion in a table 34 or other part of the machine, and having said rocking movement imparted to it at the desired time either by hand or by connection with any automatic mechanism so as to either swing the finger into engaging position as shown in Fig. 12 or out of engagement, as shown in Fig. 11.

The group of driving pulleys may comprise more than two, if desired, so long as the locking bolt of one pulley when moved to release the rim of said pulley from the web thereof also acts to arrest the rotation of the unclutching member of the adjoining pulley, or on the other hand, when both pulleys rotate at the same speed, a single bolt may serve to lock together the webs and rims of adjoining pulleys and thus serve when retracted to release the rims of both pulleys from their center webs and thus stop the machine irrespective of the pulley with which the driving belt was engaged.

In the web 2ª is formed an opening 35, which permits ready access to the ring 3ᶜ when it is desired to impart a partial turn to the latter in order to re-lock the rim 3ᵇ and web 3ª.

Figure 13:
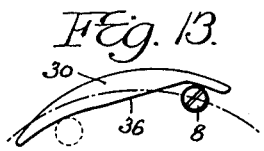
Fig. 13 is a side view of a modified form of said finger.

The finger 30 may, if desired, act to unclutch the pulley 2 by causing the roller 8 of the locking bolt 9 to project beyond the left-hand face of said pulley and providing said finger 30 with a cam face 36, as shown for instance in Fig. 13, for acting on said roller and imparting inward movement to the bolt 9, the movement of the web member of said pulley being arrested before the roller 8 passes beyond the finger 30.

I claim:

1. A clutching and releasing device in which are combined a plurality of pulleys each comprising a central web member and a rim member rotatably mounted thereon, means for normally locking together the web and rim members of each pulley, a movable unclutching member, and means whereby said unclutching member is caused to effect the unlocking of the web and rim members of the plurality of pulleys.

2. A clutching and releasing device in which are combined a plurality of pulleys each comprising a central web member and a rim member rotatably mounted thereon, means for normally locking together the web and rim members of each pulley, a movable unclutching member, and means whereby said unclutching member is caused to effect the unlocking of the web and rim members of the pulleys in succession.

3. The combination, in a clutching and releasing device, of a plurality of pulleys, each comprising a central web member and a rim member rotatably mounted thereon, means for normally locking together the web and rim members of each pulley, a rotatable unclutching member, and means whereby arrest of rotation of said unclutching member is caused to effect the unlocking of the web and rim members of the plurality of pulleys.

4. The combination, in a clutching and releasing device, of a plurality of pulleys each comprising a web member and a rim member rotatably mounted thereon, means for normally locking each web member to its rim member, a movable unclutching member for each of said pulleys, and means whereby the unclutching member of one pulley is caused to release the web and rim members of said pulley and also cause the unclutching member of an adjoining pulley to act upon the locking devices of the latter.

5. The combination, in a clutching and releasing device, of a plurality of pulleys each comprising a web member and a rim member rotatably mounted thereon, means for normally locking each web member to its rim member, each of said web members having an unclutching member movable therewith, means whereby arrest of such movement is caused to release the web and rim members of its respective pulley, and means whereby such arrest of movement of the unclutching member of one pulley is caused to effect like arrest of movement of the unclutching member of an adjoining pulley.

6. The combination, in a clutching and releasing device, of a plurality of pulleys disposed in proximity to one another, stop mechanism carried by each of said pulleys, means whereby the stop mechanism of one of the pulleys is rendered operative to unclutch said pulley, and means whereby the stop mechanism of said first pulley is caused to actuate the unclutching mechanism of an adjoining pulley to unclutch the latter.

7. A clutching and releasing device in which are combined a plurality of pulleys disposed side by side and of the same diameter to permit shifting of a belt from one to the other, each pulley comprising a central web member and a rim member rotatably mounted thereon, means for normally locking together the web and rim members of each pulley, a movable unclutching member, and means whereby said unclutching member is caused to effect the unlocking of the web and rim members of the plurality of pulleys.

8. A clutching and releasing device in which are combined a plurality of pulleys disposed side by side and of the same diameter, whereby a belt can be shifted from one to the other, each of said pulleys comprising a central web member and a rim member rotatably mounted thereon, means for normally locking together the web and rim members of each pulley, a movable unclutching member, and means whereby said unclutching member is caused to effect unlocking of the web and rim members of the pulleys in succession.

9. The combination, in a clutching and releasing device, of a plurality of pulleys disposed side by side and of the same diameter, whereby a belt can be readily shifted from one to the other, each of said pulleys comprising a central web member and a rim member rotatably mounted thereon, means for normally locking together the web and rim members of each pulley, a rotatable unclutching member, and means whereby arrest of rotation of said unclutching member is caused to effect the unlocking of the web and rim members of the plurality of pulleys.

10. The combination, in a clutching and releasing device, of a plurality of pulleys disposed side by side and of the same diameter, whereby a belt can be readily shifted from one to the other, each of said pulleys comprising a web member and rim member rotatably mounted thereon, means for normally locking each web member to its rim member, a movable unclutching member for each of said pulleys, and means whereby the unclutching member of one pulley is caused to release the web and rim members of said pulley, and also cause the unclutching member of the adjoining pulley to act upon locking devices of the latter.

11. The combination, in a clutching and releasing device, of a plurality of pulleys disposed side by side and of the same diameter, whereby a belt can be readily shifted from one to the other, each of said pulleys comprising a web member and a rim member rotatably mounted thereon, means for locking each web member to its rim member, each of said web members having an unclutching member movable therewith, means whereby arrest of said movement is caused to release the web and rim members of its respective pulley, and means whereby such arrest of movement of the unclutching member of one pulley is caused to effect like arrest of movement of the unclutching member of the adjoining pulley.

In testimony whereof, I have signed my name to this specification, in the presence of two subscribing witnesses.

ROBERT W. SCOTT.

Witnesses:
  WALTER L. TOY,
  MINNIE BROWN.